Aug. 25, 1925.
J. FAZIO
DISPENSING DISPLAY
Filed July 7, 1924
1,551,475
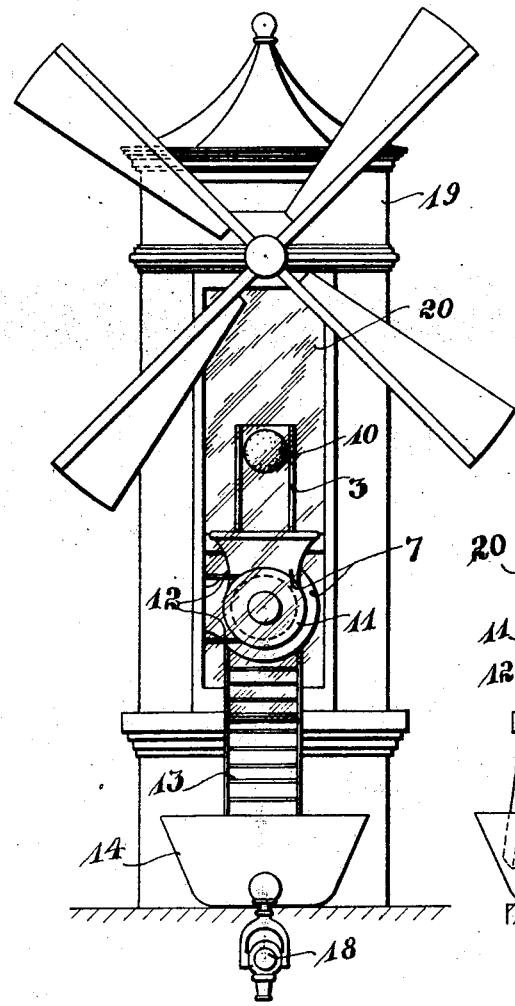
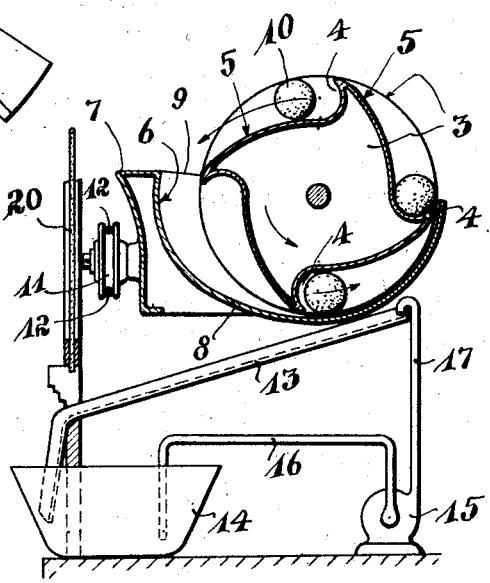
INVENTOR:
JAMES FAZIO,
By: Otto H. Krueger,
his Atty.

Patented Aug. 25, 1925.

1,551,475

UNITED STATES PATENT OFFICE.

JAMES FAZIO, OF VENICE, CALIFORNIA.

DISPENSING DISPLAY.

Application filed July 7, 1924. Serial No. 724,684.

*To all whom it may concern:*

Be it known that I, JAMES FAZIO, a citizen of the United States, residing at Venice, in the county of Los Angeles and State of California, have invented a new and useful Dispensing Display, of which the following is a specification.

This invention relates to devices used at places where fruit-juice is dispensed to attract attention to such a place.

One of the objects of this invention is to provide a device by which fruit or the like is handled in such a manner as to produce the effect that such fruit or similar articles are used in producing the juice dispensed at such a stand.

Another object is to provide a device that has the appearance of a fruit crusher as seen from the front, in connection with a rotating wheel disposed behind the apparent fruit crushing device.

Another object is to provide a rotating wheel with pockets to handle fruit or the like in a desired manner.

Another object is to provide the surfaces of baffles or actuating plates for such fruit and other similar articles, of such a form that such fruit or articles will practically not drop materially, so as to avoid a damaging of fruit.

Another object is to provide a structure through which fruit and other similar articles will easily roll without any material drop or hit.

Other objects will appear from the following description and appended claims as well as from the accompanying drawing, in which—

Fig. 1 is a front elevation of a housing with an opening in the front through which certain of the operating mechanism appear.

Fig. 2 is a fragmentary vertical midsectional view through the actuating mechanism, including fluid circulating mechanism in side elevation.

To attract attention to a dispensing of drinks, it is of advantage to display mechanism of a kind that makes it appear that the drinks are produced directly at the dispensing stand.

One difficulty arises with orange-dispensing displays. In handling oranges at a dispensing stand the sensitiveness of the oranges must be taken into consideration.

Oranges become easily soft when hit or even touched in the slightest manner.

Even slightly damaged fruit will quickly spoil so as to make it useless as an attraction.

Damaged oranges can also not very well be made to roll easily.

Causing oranges or other similar articles to roll or move freely is to some extent quite an attraction in itself, but for the above reasons the rolling or moving, especially with oranges, must be accomplished without material drops or that the oranges are hit to any serious extent.

To accomplish this, the actuating and receiving surfaces in the device as illustrated in the drawing, have been formed and designed so that such fruit or articles may be circulated or actuated without being materially hit or dropped.

The wheel 3 is provided with a number of pockets 4. The discharging sides of the pockets are formed along curves that will allow fruit to slowly roll in a suitable curve as indicated at 5. The receiving side, especially the surface of the receiving side 6 of a device that has the appearance of a fruit crushing device as seen from the front, is so designed that it may cooperate with the curves of the sides 5 of the wheel, so as to easily receive any fruit that is discharged over the curved sides 5 of the wheel. A device of the appearance of a fruit-crushing device is indicated at 7 in Fig. 1, in front elevation. This apparent fruit-crushing device, however, is formed towards the rear to receive articles discharged from the rotating wheel 3. This apparent fruit-crushing device consists therefore towards the rear mainly of the curved bottom 8 and two flat sides 9.

One article is indicated at 10 in a position to roll downwardly over the curved side 5 of the wheel. As this article 10 descends downwardly it is received in the curved side 6 so that it will easily roll downwardly along the curved bottom 8.

Inasmuch as the wheel 3 rotates, any article rolling downwardly or along the curved bottom 8, it can easily be arranged so that the wheel turns just fast enough that one of the pockets 4 will just follow the rolling or downward moving article, so that such article will never materially drop nor will such an article be materially hit, as will easily be understood without further illustration or explanation. The curves 5 and 6 are merely designed and proportioned so that the downward moving article will just be caused to roll slowly along such curves.

A pulley 11 and a belt 12 are provided to complete the illusion that the device 7 is actually a fruit-crushing device in which the downward moving fruit is being crushed.

To further complete the impression or illusion that such fruit is actually crushed, a trough 13 is provided to extend downwardly from behind the apparent fruit-crushing device into a receptacle 14. A small pump 15 is provided to draw fluid from the receptacle through the pipe 16 to deliver such fluid through the pipe 17 to the upper end of the trough 13. Such fluid will then easily pass downwardly over the trough back into the receptacle 14, tending to give the impression that the fluid is the juice extracted from the downwardly moving fruit.

A faucet 18 is provided just below the receptacle 14 to make it appear that dispensed juice is drawn from the receptacle 14.

The opening in the front of the housing 19 is preferably provided with a transparent covering or front as indicated at 20.

Having thus described my invention, I claim:

1. In a dispensing display, a cabinet having an opening in the front, a device of the appearance of a juice-extracting device, and a wheel disposed to rotate about a horizontal axis behind and extending above the said device having pockets in which fruit or the like may be carried to the top of the wheel to fall from the wheel into said device upon reaching a point past the top as the wheel rotates towards the device.

2. In a dispensing display of the class described, a mechanism for handling fruit and the like comprising a wheel disposed to rotate about a horizontal axis having pockets in its periphery, and a device of the appearance of a juice-extracting device, the discharging sides of the wheel and the receiving side of the device being curved so as to cause fruit or the like handled in the mechanism to roll downwardly along such curves without material drop or hit.

3. In a dispensing display of the class described, a wheel having pockets in its periphery formed and curved so that fruit or the like may be lifted on one side of the wheel while allowed to roll out of the pocket on the opposite side of the wheel in a radial tangential direction.

4. In a dispensing display of the class described, a wheel having pockets, one side in each of the pockets being of somewhat concave form with its outer edge curving over the bottom of the pockets, the opposite side in each of the pockets being of somewhat convex form curving outwardly from the bottom in a tangential manner in relation to the center of the wheel.

In testimony that I claim the foregoing as my invention I have signed my name.

JAMES FAZIO.